United States Patent
Frankel et al.

(10) Patent No.: US 7,184,410 B1
(45) Date of Patent: Feb. 27, 2007

(54) METHOD AND SYSTEM FOR USING OPTICAL PHASE CONJUGATION IN AN OPTICAL COMMUNICATIONS NETWORK INCLUDING AN ADD/DROP MULTIPLEXER

(75) Inventors: Michael Y. Frankel, Baltimore, MD (US); Harshad P. Sardesai, Ellicott City, MD (US)

(73) Assignee: Ciena Corporation, Linthicum, MD (US)

( * ) Notice: Subject to any disclaimer, the term of this patent is extended or adjusted under 35 U.S.C. 154(b) by 1122 days.

(21) Appl. No.: 10/174,025

(22) Filed: Jun. 18, 2002

Related U.S. Application Data (63) Continuation-in-part of application No. 10/139,270, filed on May 3, 2002.

(51) Int. Cl.
*H04J 1/16* (2006.01)
(52) U.S. Cl. .................... 370/252; 370/535; 398/43; 398/150
(58) Field of Classification Search ................. 370/252, 370/386, 535, 430; 398/150, 147, 43; 385/27
See application file for complete search history.

(56) References Cited

U.S. PATENT DOCUMENTS

| | | | | |
|---|---|---|---|---|
| 5,365,362 A | * | 11/1994 | Gnauck et al. ............. 398/150 |
| 5,963,361 A | | 10/1999 | Taylor et al. ............... 359/337 |
| 5,978,115 A | | 11/1999 | Condict et al. .............. 398/79 |
| 6,049,413 A | | 4/2000 | Taylor et al. ............... 359/337 |
| 6,057,959 A | | 5/2000 | Taylor et al. .......... 359/337.13 |
| 6,061,171 A | | 5/2000 | Taylor et al. ............ 359/337.1 |
| 6,175,435 B1 | | 1/2001 | Watanabe ................... 398/150 |
| 6,259,845 B1 | | 7/2001 | Sardesai ..................... 385/123 |

FOREIGN PATENT DOCUMENTS

EP 1133031 9/2001

OTHER PUBLICATIONS

A. J. Lucero, et al., "Impact of bit pattern and dispersion variation on cross-phase modulation penalty," Optical Fiber Communications Conference Technical Digest, 1999, vol. 3, pp. 37-38.
L. E. Nelson, et al., "Resonances in cross-phase modulation impairment in wavelength-division-multiplexed lightwave transmission," IEEE Photonics Technology Letters, vol. 11, No. 7, Jul. 1999, pp. 907-909.
S. G. Evangelides, Jr., "Cross phase modulation resonances in WDM systems," Optical Fiber Communications Conference Technical Digest, 1999, vol. 3, pp. 240-242.

(Continued)

*Primary Examiner*—John Pezzlo
(74) *Attorney, Agent, or Firm*—Merek, Blackman & Voorhees, LLC (57) ABSTRACT

A method and system for using optical phase conjugation in an optical communications network including an add-drop multiplexer. The method includes determining a position for an optical phase conjugator such that channel quality for a channel in improved above a threshold. Transmission characteristics such as amplifier launch power or dispersion features may be adjusted to compliment the optical phase conjugation. An alternate method includes positioning the optical phase conjugator to improve a weighted average channel quality for the network.

23 Claims, 10 Drawing Sheets

OTHER PUBLICATIONS

Giovanni Bellotti, et al., "10×10 Gb/s cross-phase modulation suppressor for multispan transmission using WDM narrow-band fiber Bragg gratings," IEEE Photonics Technology Letters, vol. 12, Oct. 2000, pp. 1403-1405.

Amnon Yariv, et al., "Compensation for channel dispersion by nonlinear optical phase conjugation," Optical Society of America, 1978.

Chaloemphon Lorattanasane, et al., "Design theory of long distance optical transmission systems using midway optical phase conjugation," Journal of Lightwave Technology, vol. 15, Jun. 1997, pp. 948-955.

Thomas Merker, et al. "High bit rate OTDM transmission over standard fiber using mid-span spectral inversion and its applications," IEEE Journal of Selected Optics in Quantum Electronics, vol. 6, No. 2, Mar./Apr. 2000, pp. 258-262.

Pasu Kaewplung, et al., "Feasibility of 100-gb/s 10000-km single-channel optical transmission by midway optical phase conjugation incorporated with third-order dispersion compensation," IEEE Photonics Technology Letters, vol. 13, No. 4, Apr. 2001, pp. 293-295.

P. Y. Cortes, et al., "Numerical simulation of 10-Gbit/s transmission over 9000 km with 50-km amplifier spacing using optical phase conjugation in the terminal unit," 1997 Optical Fiber Comm Conference Technical Digest, pp. 201-202.

M.-H. Chou, et al., "Optical frequency mixers for WDM and TDM applications," 2000 Optical Fiber Comm Conference Technical Digest, paper FB1-1-FB1-4.

Alexandra G. Gandpierre, et al., "Theory of stimulated Raman scattering cancellation in wavelength-division-multiplexed systems via spectral inversion," IEEE Phot. Techn. Lett., vol. 11, pp. 1271-1273, Oct. 1999.

* cited by examiner

METHOD AND SYSTEM FOR USING OPTICAL PHASE CONJUGATION IN AN OPTICAL COMMUNICATIONS NETWORK INCLUDING AN ADD/DROP MULTIPLEXER

CROSS-REFERENCE TO RELATED APPLICATIONS

This application is a continuation-in-part of U.S. patent application Ser. No. 10/139,270, filed May 3, 2002, the entire contents of which are incorporated herein by reference.

BACKGROUND OF THE INVENTION

1. Field of Invention

This invention relates to a method and system for using optical phase conjugation in an optical communications network.

2. Description of Related Art

Fiber-optic communication networks are experiencing rapidly increasing deployment. Especially rapid is the growth of segments that carry multi-gigabit digital data on multiple wavelengths over a single fiber strand, which are known as wavelength division multiplexing (WDM). The wavelength channel density (i.e., the number of channels carried by one fiber) and the data rate carried on individual wavelengths continue to increase. Current systems employ 50 GHz channel spacing, but 25 GHz and 12.5 GHz channel spacings are expected to be utilized. Data rates of 10 Gbps are currently used, but 40 Gbps data rates are also expected. Both increased channel density and increased data rate contribute to increased crosstalk between channels.

Several linear and non-linear effects contribute to the deterioration of the signal and crosstalk. One linear effect that limits transmission length is chromatic dispersion, which causes signal bits to spread due the wavelength dependence of the index of refraction of the transmission fiber. Since a bit contains many wavelengths traveling at different speeds, the bit tends to distort as it travels along the transmission fiber resulting in inter-symbol interference and bit errors.

Non-linear effects also induce crosstalk and deteriorate signal quality. For passive optical fibers, the crosstalk mechanisms include cross-phase modulation, four-wave mixing, and Raman crosstalk. Further, active components such as fiber-based or semiconductor based optical amplifiers will add cross-gain modulation. These nonlinear crosstalk effects, arising due to the fiber Kerr non-linearity and due to the Raman effect, are additive to the overall interference level. The additive effect occurs in terms of each additional wavelength channel contributing a crosstalk component to the overall interference level. The additive effect also occurs in systems that have multiple optical links with intermediate optical amplification, such that each link additively contributes a crosstalk component to the overall noise level. Accordingly, the additive non-linear effects can significantly impact performance of WDM transmission systems, particularly those over long distances, having multiple links, each including amplifiers.

The non-linear effects described above, specifically self-phase-modulation and cross-phase-modulation are coupled to dispersion compensation. Specifically, the non-linear phase imparted to an information-bearing channel from its own intensity modulation (i.e. self-phase-modulation or SPM) or due to the intensity modulation of its neighbors (cross-phase-modulation or XPM) gets converted to intensity noise through dispersion. For example, the amount of intensity noise generated due to SPM and XPM at a direct detection receiver (which is insensitive to optical phase noise), depends not only on the amount of phase noise generated through the non-linear process, but also the extent to which this phase noise gets converted to intensity noise from uncompensated dispersion.

A simple and conventional way of mitigating the conversion to intensity noise would be to perfectly compensate the dispersion experienced by the channel. In a multi-link, multi-channel WDM system, this amounts to bringing the residual dispersion to zero at the end of each link for all channels.

While this technique of compensating dispersion does negate XPM and SPM effects in amplitude-modulated channels, it can cause resonance effects since all signals are compressed back to their start positions and are also all aligned in time (i.e., there is no time skew between signals). To avoid resonance effects, the dispersion at the end of each link is not allowed to be zero, but is kept at some small positive or negative value. Further, phase-modulated channels that use phase-sensitive receivers may require a different optimization of dispersion along the fiber link.

A second complication of this solution that arises in multi-channel systems is the inability to perfectly match the dispersion slopes of the transmission fiber and dispersion compensating fiber. This results in different channels experiencing different levels of residual dispersion at the end of each link.

A third problem with mitigating XPM and SPM effects with perfect per-link dispersion compensation is the distributed nature of SPM and XPM generation. The non-linear phase shift from SPM and XPM is generated most strongly in the sections of the fiber where the optical power is highest and optical power variations are most rapid. For amplitude-modulated channels, this section is typically in the first few kilometers of the transmission fiber following an optical amplifier. After the first few kilometers, the bit patterns of separate wavelength channels decorrelate (e.g., walk-off) which reduces XPM and/or reduce in intensity due to the fiber attenuation which reduces both XPM and SPM. Since the non-linear phase shift is generated continuously over several kilometers, the compensation has to also occur over a similar distance.

A fourth problem with mitigating SPM and XPM effects are non-overlapping dispersion optimization points for SPM compensation and XPM compensation. In some situations, small amounts of SPM are used to actually enhance system performance. For all these reasons, as transmission distances increase, it becomes more difficult to mitigate XPM and SPM generated noise by simple dispersion compensation or dispersion mapping.

Existing solutions to counteract linear effects and non-linear effects and extend system reach include optimal dispersion mapping, use of slope compensating DCF fibers, use of Raman amplification, use of Forward Error Correction (FEC), and use of optical power spectrum equalizers to flatten the spectrum. Each solution on its own and in conjunction with others can extend the reach of WDM systems. However, all solutions to counteract linear effects and non-linear effects either reduce the launch power required to maintain a required signal to noise ratio for detection (Raman amplification and FEC), or make the non-linear effects more symmetric across channels so some channels are not overly penalized (Optical power Spectrum Equalizers), or reduce the conversion of non-linear phase noise to intensity noise (slope compensating DCFs and dispersion mapping).

Even after incorporating all the above solutions, substantial amounts of non-linear effects are still present in WDM systems, especially for systems having closely spaced channels, long transmission distance and/or higher data rates. None of the known techniques offers a solution that neutralizes non-linear effects that are present after all of the commonly used solutions are used.

Optical Phase Conjugators (OPCs) provide a means for compensating for the non-linear effects. Optical phase conjugation works on the principle of spectrum inversion. Basically, as an optical signal travels through an optical fiber it experiences optical phase shifts introduced both by itself and by adjacent optical channels. In the spectral domain, these non-linear effects change the frequency content of the signal. Such phase shifts and frequency components are added with signs determined by the intensity edge slope. If such a signal passes through a device (i.e., a phase conjugator) where its optical spectrum is inverted, (that is made into a mirror image of the input), then propagation through the remaining portion of the optical fiber tends to unravel the non-linear effects impressed on the signal prior to passing through the phase conjugator. If the first and second portions of the optical fiber (the first portion being before the conjugator and the second portion after the conjugator) are roughly equal in length, dispersion and optical power, then nearly complete cancellation of the non-linear effects can be achieved in theory.

Optical phase conjugation can also be used to cancel dispersive effects in optical fiber. Early applications of optical phase conjugators were for compensating linear dispersion. The early work considered only the linear dispersive signal distortion, which could be compensated by positioning the OPC in the center of the link. Subsequent applications included compensating intra-channel distortion, such as SPM, induced by Kerr effect in the fiber, by positioning the OPC in the center of the span. Such simultaneous compensation of chromatic dispersion and non-linear effects (e.g., SPM) places simultaneous constraints on the approximate equality of both transmission fiber dispersion and accumulated nonlinear phase shift on the opposite sides of the span.

A further complication in compensating for dispersion and non-linear effects is the deployment of optical add-drop multiplexers (OADMs) where WDM channels may be added and/or dropped. Since both non-linear effects and dispersion are cumulative with propagation distance, channels dropped at a specific location could have different accumulated non-linear effects and dispersion, depending on where the channels originated even if they traveled with the same average power. This problem is further compounded by the fact that non-linear effects and dispersion are normally coupled, so dispersion compensation schemes affect signal distortions induced by non-linear effects and vice-versa.

One way to address the dispersion and non-linearity degradations associated with diverse optical paths is to carefully craft the dispersion maps. A philosophy used when tailoring dispersion maps for networks including OADMs is to not sacrifice performance of channels in attempting to enhance performance of other channels. Thus, the dispersion maps tend to be designed to produce some average performance for all channels no matter where a channel is added and/or dropped. Although such dispersion mapping is possible in theory, there may be instances where an average dispersion map may not yield acceptable Q-factor values for some OADM configurations resulting in either the system failing performance specifications or requiring use of more expensive technologies (e.g., per channel dispersion compensators) to meet performance specifications. Even if expensive technologies are employed, system performance may still not be guaranteed due to fundamental non-linearity constraints. Also, practical limitations (variability in link losses, link lengths, fiber types, dispersion compensation granularity and accuracy) make deploying theoretically good dispersion maps very difficult in real networks.

BRIEF DESCRIPTION OF THE DRAWINGS

Embodiments of the invention will become more fully understood from the detailed description given hereinbelow and the accompanying drawings which are given by way of illustration only, and thus are not limitative of the present invention, and wherein.

DETAILED DESCRIPTION OF INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

The expression "optically communicates" as used herein refers to any connection, coupling, link or the like by which optical signals carried by one optical system element are imparted to the "communicating" element. Such "optically communicating" devices are not necessarily directly connected to one another and may be separated by intermediate optical components or devices. Likewise, the expressions "connection" and "operative connection" as used herein are relative terms and do not require a direct physical connection.

Figure 1:
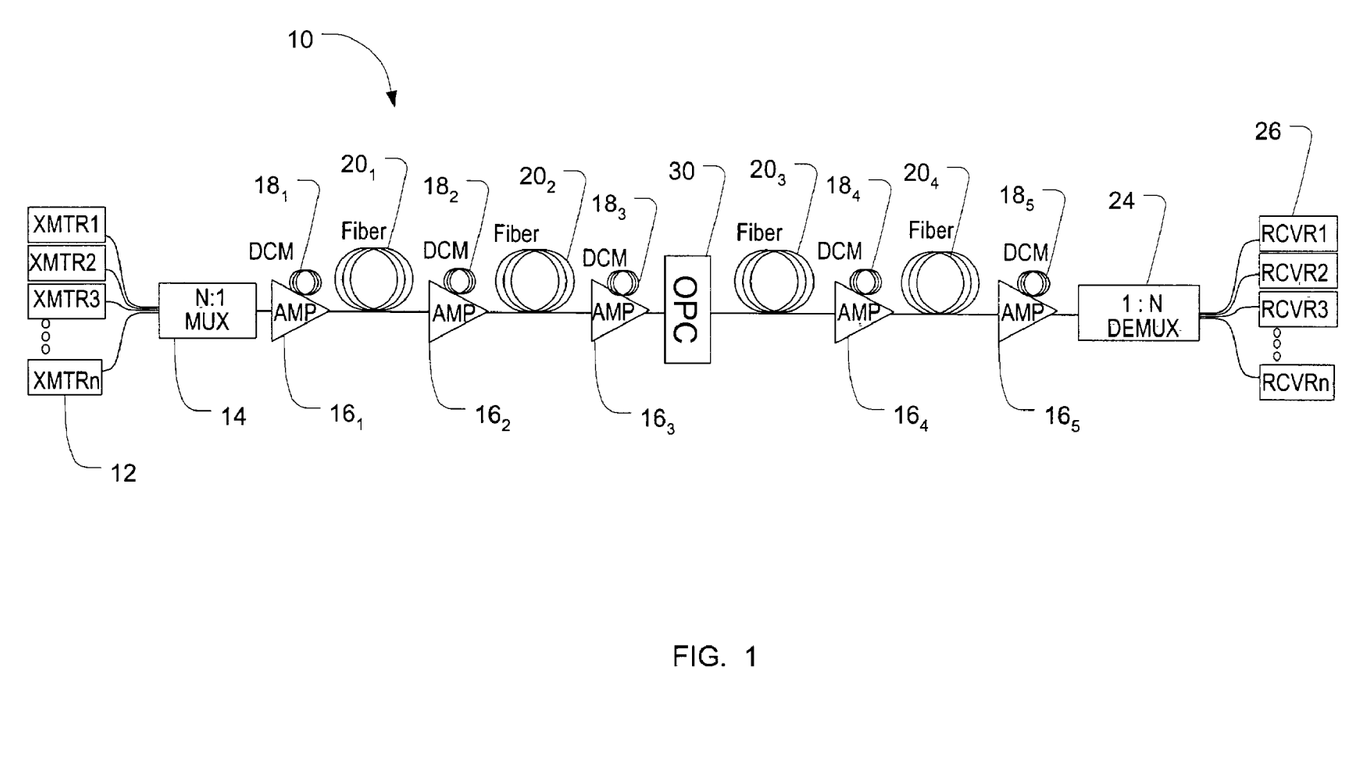
FIG. 1 is a block diagram of an exemplary optical communications network in an embodiment of the invention.

FIG. 1 depicts an optical communications network 10 in an exemplary embodiment of the invention. The network 10 includes a number of transmitters 12, each generating a transmit signal on a distinct optical wavelength for transmission over the network. The transmitters (XMTR$_1$–XMTR$_N$) 12 optically communicate with an optical multiplexer 14 that combines the individual transmit signals into a multiplexed signal. It is understood that a multilevel multiplexing may occur and a single multiplexer is depicted for convenience. The multiplexed signal is optically communicated to an amplifier 16 which may be any known type of amplifier including an optically active material (e.g., Erbium) such as an Erbium-doped fiber amplifiers (EDFA), an Erbium-doped waveguide amplifiers (EDWA) or semiconductor optical amplifiers (SOA). Optical amplification can also be accomplished in a distributed manner by utilizing Raman amplification.

Also depicted at each amplifier 16 is a dispersion compensation module (DCM) 18. It is understood that the DCM 18 need not be positioned at the amplifier site and may be positioned at any location along the transmission path. Alternatively, the DCM 18 may be included as a component within an amplifier 16 or the DCM 18 may be implemented as part of fiber link 20 (e.g., a length of dispersion compensating fiber in the link). The path from transmitters to receivers (e.g., terminal-to-terminal) is referred to as a span. A section of fiber joining two components is referred to as a link. The optical communications network may include a number of spans. The system of FIG. 1 provides periodic amplification and periodic dispersion compensation over fiber links 20 both before and after OPC 30.

The DCM 18 provides compensation for chromatic dispersion and may include a length of dispersion compensating fiber having a dispersion coefficient and length suitable to substantially counteract dispersion in the preceding fiber link. In addition, the DCM's 18 positioned after the OPC 30 may substantially compensate for chromatic dispersion and/or dispersion slope introduced by the OPC 30. Alternatively, the DCM's 18 may provide distributed dispersion compensation. In other words, the DCM's 18 are spread out across multiple links to compensate for dispersion and dispersion slope values in an "averaged" sense across multiple fiber links.

Dispersion compensation can be accomplished using conventional techniques. Some examples may include, dispersion compensating fiber, dispersion compensating fiber Bragg gratings, dispersion compensating thin film filters, etc.

In addition, the DCM 18 may control dispersion slope such that the amount of accumulated dispersion is substantially uniform across multiple channels. It is preferable to not compensate for dispersion exactly, as such compensation may lead to adverse resonant effects. Techniques for controlling dispersion and dispersion slope are disclosed in co-pending U.S. patent application Ser. Nos. 09/844,830 and 09/844,826 filed Apr. 27, 2001 and commonly-owned by the assignee of this application.

In an alternate embodiment, the dispersion compensation and/or dispersion slope compensation may be provided by including dispersion compensating fiber as part of the fiber link 20. Thus, the DCM 18 is not limited to components or devices separate from the fiber link 20, but may be implemented as part of the fiber link 20.

The DCM 18 optically communicates with the fiber link 20. In an exemplary embodiment, the fiber link 20 is non-dispersion shifted fiber (NDSF) but may be implemented using other types of fiber such as dispersion-shifted fiber (DSF). The fiber link 20 optically communicates with further amplifiers 16$n$, DCM's 18$n$ and fiber links 20$n$ that make up the transmission path. A demultiplexer 24 in optical communication with the final amplifier 16$_S$ demultiplexes a conjugate signal to derive a number of receive signals, each on a different carrier wavelength. A multi-level demultiplexer may be used and a single demultiplexer is depicted for convenience. Each receive signal is directed to an appropriate receiver (RCVR$_1$–RCVR$_N$) 26 designated for a particular wavelength.

Also located in the transmission path is an optical phase conjugator 30. In the embodiment shown in FIG. 1, the OPC 30 is disposed between transmitters 12 and receivers 26 so that non-linear effects experienced prior to the OPC 30 are compensated for by the transmission path after the OPC. If the transmission path experiences substantially constant non-linear effects per unit length, the OPC 30 may be placed approximately at the physical center of the transmission path. Of course, if the transmission path has varying non-linear effects, then the OPC 30 is positioned so that the accumulated non-linear effects prior to the OPC 30 are canceled by non-linear effects after the OPC 30.

The OPC 30 may be implemented using known techniques. For example, four-wave mixing in a highly nonlinear fiber can be used to generate the optically conjugated wave. Another example may be the use of four-wave mixing in a semiconductor optical amplifier. Another example may be the use of three-wave mixing in an electro-optic waveguide, as could be made with a LiNbO$_3$ material. Such devices typically employ a pumping light source for outputting a pumping light and a non-linear optical material for receiving signal light and the pumping light. An optical filter may be used to separate the phase conjugate light from non-phase conjugate light as desired.

Figure 2:
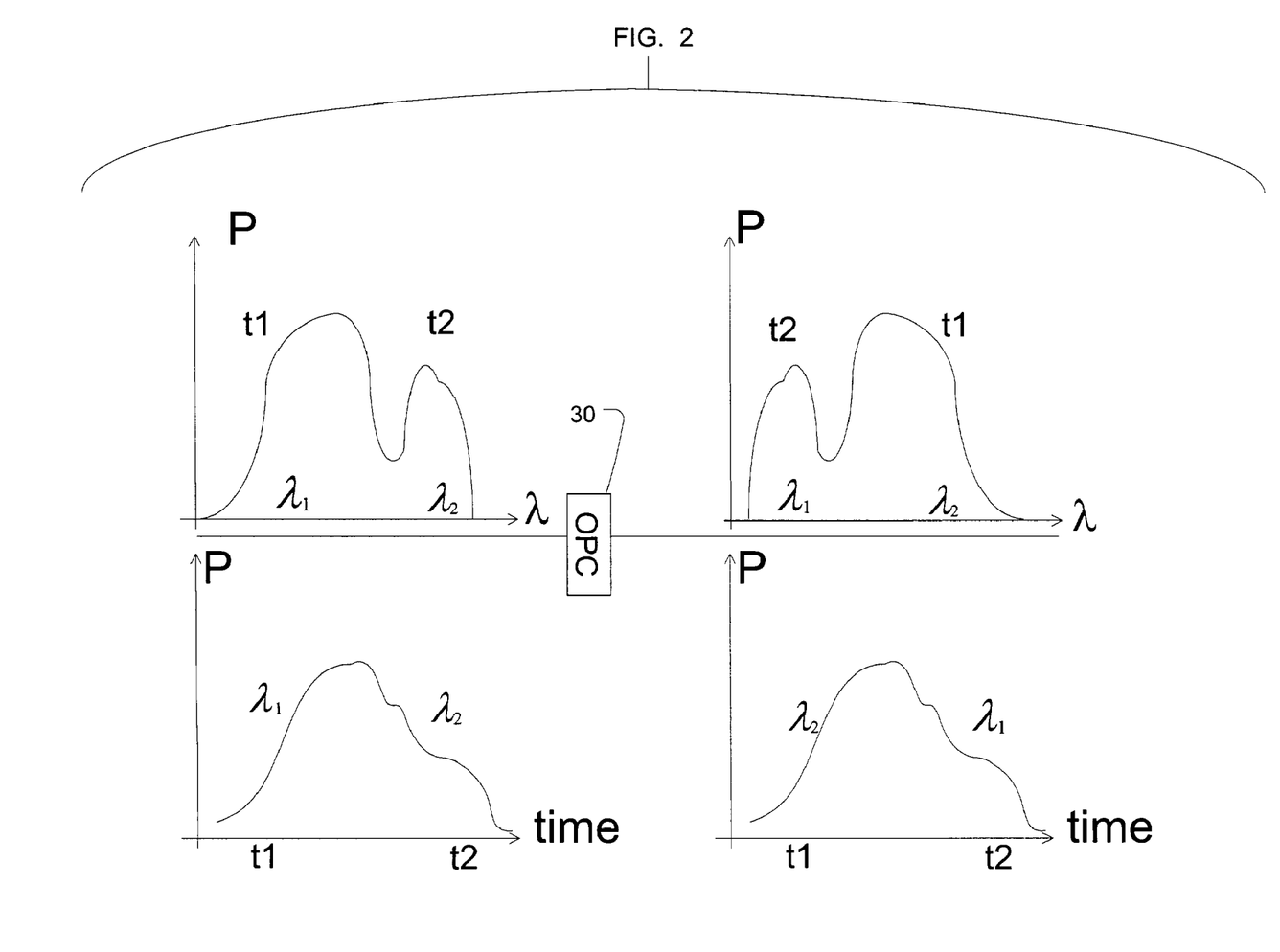
FIG. 2 illustrates the effect of optical phase conjugation on a signal spectrum and power envelope.

The OPC 30 receives the incoming multiplexed signal and produces a conjugate signal with a spectrally inverted, shifted, and phase-conjugated characteristics. FIG. 2 depicts optical power versus wavelength and optical power versus time both before and after the OPC 30. As shown in FIG. 2, the OPC 30 repositions wavelengths in a pulse so that leading edge wavelengths $\lambda_1$ are placed at the trailing edge of the conjugated pulse and trailing edge wavelengths $\lambda_2$ are placed at the leading edge of the conjugated pulse This conjugate signal is again propagated though a series of fiber links 20, with periodic amplification at amplifiers 16 and dispersion compensation at DCM's 18. The non-linear effects that are added after the OPC 30 by the fiber links act to cancel a portion of the non-linear effects accumulated before the OPC 30. Thus, as the signal propagates, the non-linear effects are gradually mitigated resulting in a performance improvement relative to a similar system without OPC 30. The non-linear effects are mitigated up to the point where the nonlinear effects accumulated in front of the OPC are largely cancelled by the propagation after the OPC. Beyond this distance, the non-linear effects start to grow again.

In the system of FIG. 1, the dispersion compensation modules 18 are separate components from the OPC 30. Thus, the compensation of dispersion (and optionally dispersion slope) is decoupled from the compensation of non-linear effects. This eliminates the trade-offs often encountered when attempting to correct both dispersion and non-linear effects with a common device. Accordingly, a more accurate compensation of dispersion and non-linear effects may be achieved.

Figure 3:
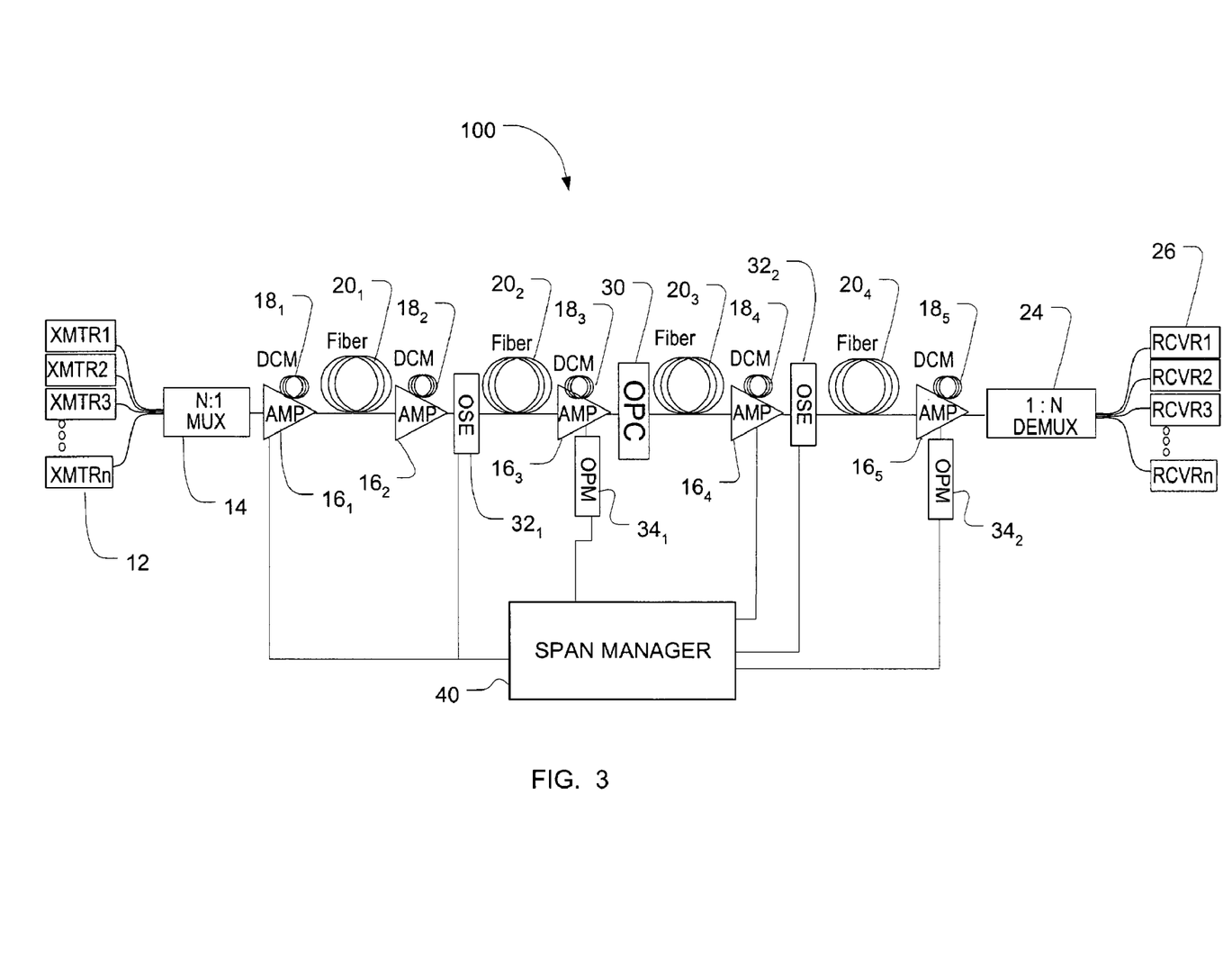
FIG. 3 is a block diagram of an exemplary optical communications network in an alternate embodiment of the invention.

FIG. 3 depicts an optical communications network 100 in an alternate embodiment of the invention. Several non-linear effects are dependent on the power of the signal. A more accurate cancellation of non-linear effects, both due to Kerr non-linearity and due to Raman scattering, relies on a proper balance of accumulated dispersion and power in each of the optical carrier wavelengths. Power non-uniformity may be introduced by mechanisms such as wavelength-dependent fiber loss, optical amplifier gain ripple, and stimulated Raman inter-channel power transfer.

FIG. 3 shows an embodiment that includes optical power measurement (OPM) device 34 and optical power spectral equalizer (OSE) 32. The OPM device 34 monitors power across channels and the OSE 32 attenuates channel power(s) so that each channel has substantially equal power. The OPM device 34 is normally out of the optical signal path so it does not directly modify the signals. The OSE 32 is in the optical path to achieve desired signal manipulation. All non-linear effects (e.g., self-phase modulation, cross-phase modulation) are power dependent. By controlling power across channels, non-linear effects accumulate in a similar manner for each channel. This facilitates compensation of the non-linear effects since each channel can be compensated in a similar manner. By simultaneously controlling composite signal power launched into each fiber link as well as power across channels, a more accurate compensation is achieved.

As shown in FIG. 3, OPM device 34 and OSE 32 may be placed on both sides of the OPC 30. This allows the signal prior to the OPC 30 to have substantially the same power as the conjugate signal after the OPC 30. Accordingly, the power-dependent, non-linear effects accumulated prior to the OPC 30 are substantially cancelled by the transmission path after the OPC 30.

Control of the amplifiers and OSE's may be performed by a span manager 40 in communication with the amplifiers 16 and OSE's 32 and OPM devices 34. The span manager 40 may communicate with the amplifiers 16 and OSE's 32 and the OPM devices 34 using known techniques (e.g., over an in-band or out-of-band service channel, overlay IP network, etc.). The span manager 40 communicates with the OPM devices 34 and receives information about the state of the optical channels (e.g., power, wavelength, optical signal-to-noise ratio, etc.) at that point in optical communications network 100. The span manager 40 then directs the amplifiers 16 to set the desired composite power level and OSE's 32 to change attenuation levels for different channels to provide substantially uniform power across channels. The span manager 40 may poll the OPM devices 34 additionally to ensure that the desired result is achieved. One OPM device 34 and one OSE 32 may be designated for controlling optical power in a sub-span. The power management performed by the span manager 40 may be local, on a sub-span basis or global across multiple sub-spans.

Figure 4:
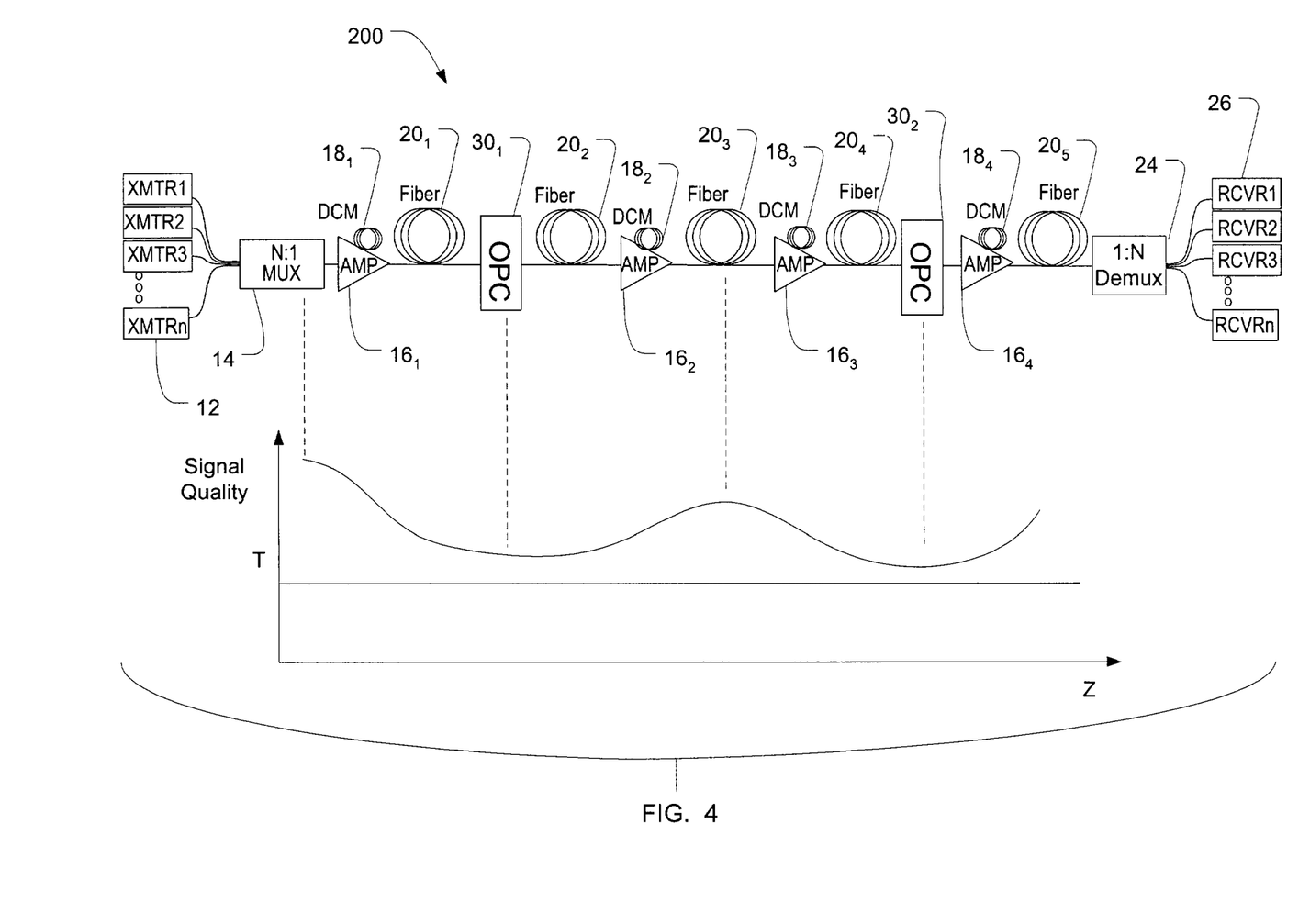
FIG. 4 is a block diagram of an exemplary optical communications network in another embodiment of the invention.

Multiple OPC's may be positioned along the transmission path between the transmitters 12 and receivers 26 to prevent excessive accumulation of nonlinear impairments, especially in cases where the fiber links are substantially different, or where wavelength channels may need to be dropped or added at intermediate points. FIG. 4 depicts an optical communications network 200 in another embodiment of the invention where the transmission path includes a plurality of OPC's $30_1$ and $30_2$.

Also shown in FIG. 4 is a plot of signal quality with respect to position along the transmission path. The signal quality may be represented by bit error rate, signal-noise ratio, etc. and is only exemplary to illustrate the effect of the OPC's. As shown in FIG. 4, the initial signal quality deteriorates due to due to noise accumulation and non-linear effects until the signal reaches first OPC $30_1$ at which point the conjugate signal is generated. After OPC $30_1$, the signal quality increases due to the non-linear effects being applied to the conjugate signal. After some point, the non-linear effects created prior to OPC $30_1$ are compensated and the non-linear effects begin to have deleterious effect on the signal until reaching OPC $30_2$. At OPC $30_2$, the signal is subjected to conjugation and thereafter the non-linear effects experienced prior to OPC $30_2$ are compensated. The signal is received a demultiplexer 24 for distribution to receivers 26. The OPC's may be located along the transmission path so that the signal quality is prevented from dropping below a limit, shown as T in FIG. 4.

In the above described embodiments, DCM's 18 are used to compensate linear effects such as dispersion and dispersion slope. The OPC's 30 are used to compensate non-linear effects such as self-phase modulation, cross-phase modulation, etc. Compensating linear effects and non-linear effects using separate devices provides a greater degree of control and allows compensation to be enhanced for each type of effect. In addition, OPM devices 32, amplifiers 16 and OSE's 34 may be used to control the power across channels providing yet another degree of control.

Figure 5:
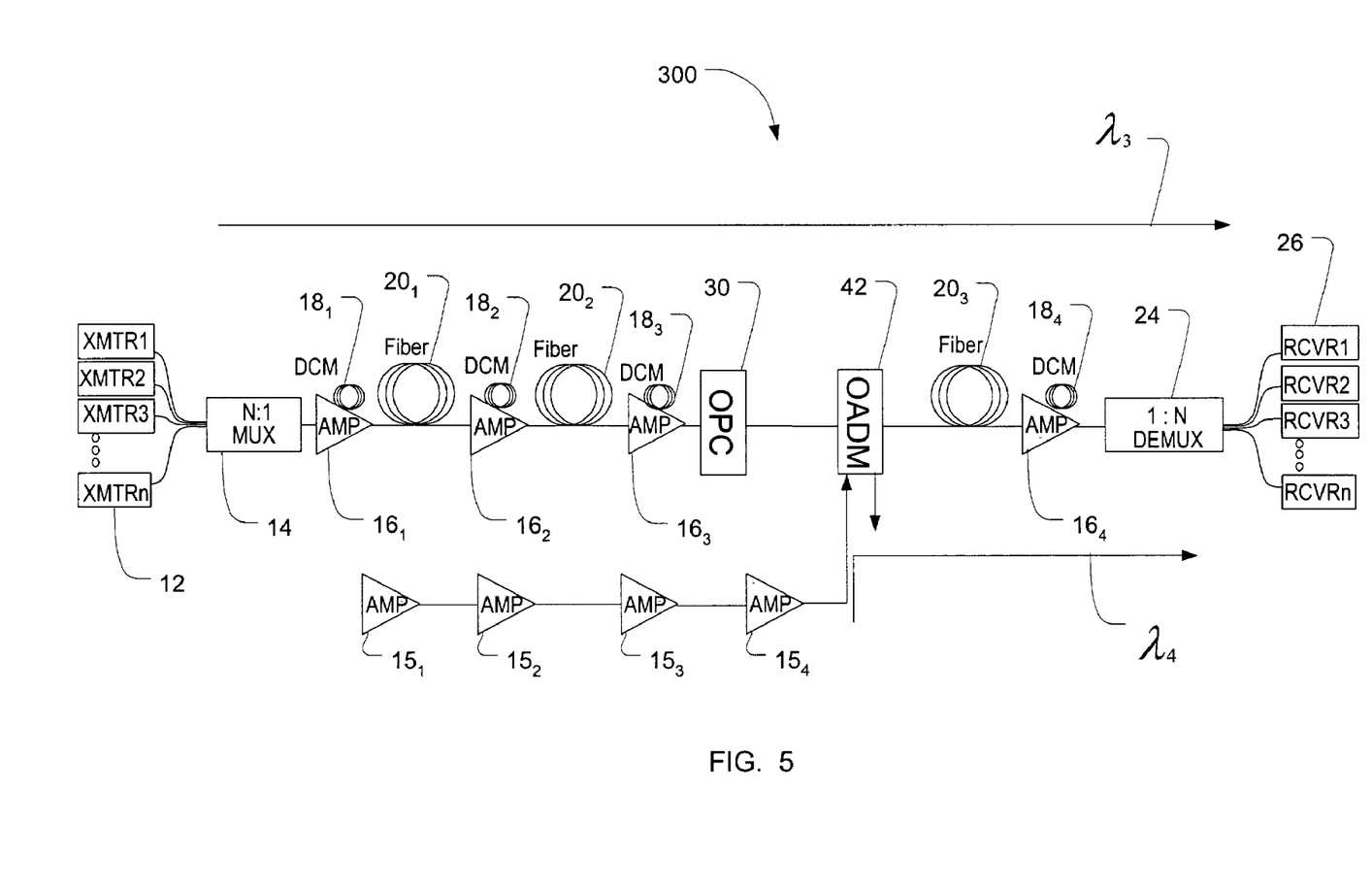
FIG. 5 is a block diagram of an exemplary optical communications network in another embodiment of the invention.

FIG. 5 is a block diagram of an exemplary optical communications network 300 in another embodiment of the invention. The optical communications network 300 includes elements similar to those shown in FIG. 1. In addition, optical communications network 300 includes an optical add-drop multiplexer (OADM) 42. Depending on where channels are introduced on the optical communications network 300, channels may or may not pass through the OPC 30. For example, a first channel designated as $\lambda_3$ traverses the entire optical communications network 300 and passes through the OPC 30.

Another channel, designated as $\lambda_4$ originates at OADM 42 and does not pass through the OPC 30. The second channel passes through a number of amplifiers $15_1$–$15_4$. As noted above, non-linear effects are power-dependent. Accordingly, the channels passing through amplifiers $15_1$–$15_4$ may experience more non-linear effects than channels in the first path. It is understood that many channels may traverse the same path.

Figure 6:
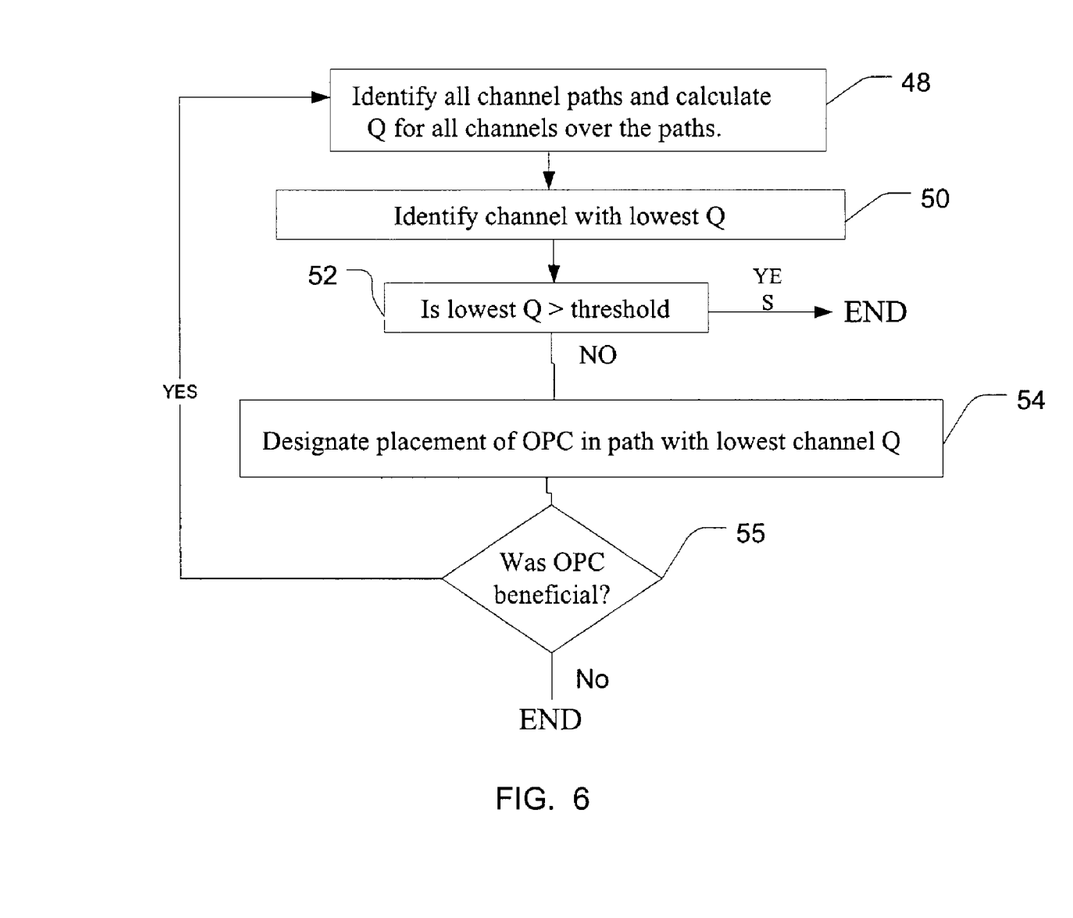
FIG. 6 is a flowchart of an exemplary process for positioning an OPC.

FIG. 6 is flowchart of an exemplary process for determining placement of an OPC in an optical communications network having one or more OADMs. The process begins at step 48 where all possible signal paths are examined and channel quality, represented by a Q value, is determined for each channel traversing a particular path. Add/drop paths may be considered as paths originating or terminating at OADM 42. The channel quality may be based on factors such as signal to noise ratio, bit error rate and/or combinations of these factors. Determination of channel quality may be performed empirically by measuring channel quality at the termination of the path (e.g., at receivers 26). Alternatively, channel quality may be derived based on models of the optical communications network 300.

Once the channel quality, Q, is determined for all channels and paths in the optical communications network, the channel having the lowest Q value is identified at step 50 and compared to a threshold at step 52. The threshold may be based on system specifications defining minimum acceptable levels for signal-to-noise ratio, bit error rate, etc. If the lowest Q value exceeds the threshold, then no OPC is needed in the optical communications network 300, and the process terminates.

If the lowest Q value does not exceed the threshold at step 52, flow proceeds to step 54 where it is determined to place the OPC in the path having the channel with the lowest Q value. As noted above with respect to FIG. 1, the OPC should be placed so that non-linear effects prior to the OPC are counteracted by the transmission after the OPC. In a transmission path having substantially uniform non-linear effects per length, the OPC may be placed approximately in the physical center of the transmission path. At step 55, it is determined whether the OPC improved performance by raising the channel quality for the path with the lowest Q. This may be determined empirically by measuring channel quality or based on models of the network. If not, the process ends and no OPC is employed in the span.

If at step 55 the OPC is determined to improve channel quality, the process of FIG. 6 may be repeated until all channels in the optical communications network satisfy the performance threshold by adding additional OPCs where needed. The process terminates when either all channels satisfy the minimum Q condition, or the addition of an OPC does not result in an increase in channel quality.

Figure 7:
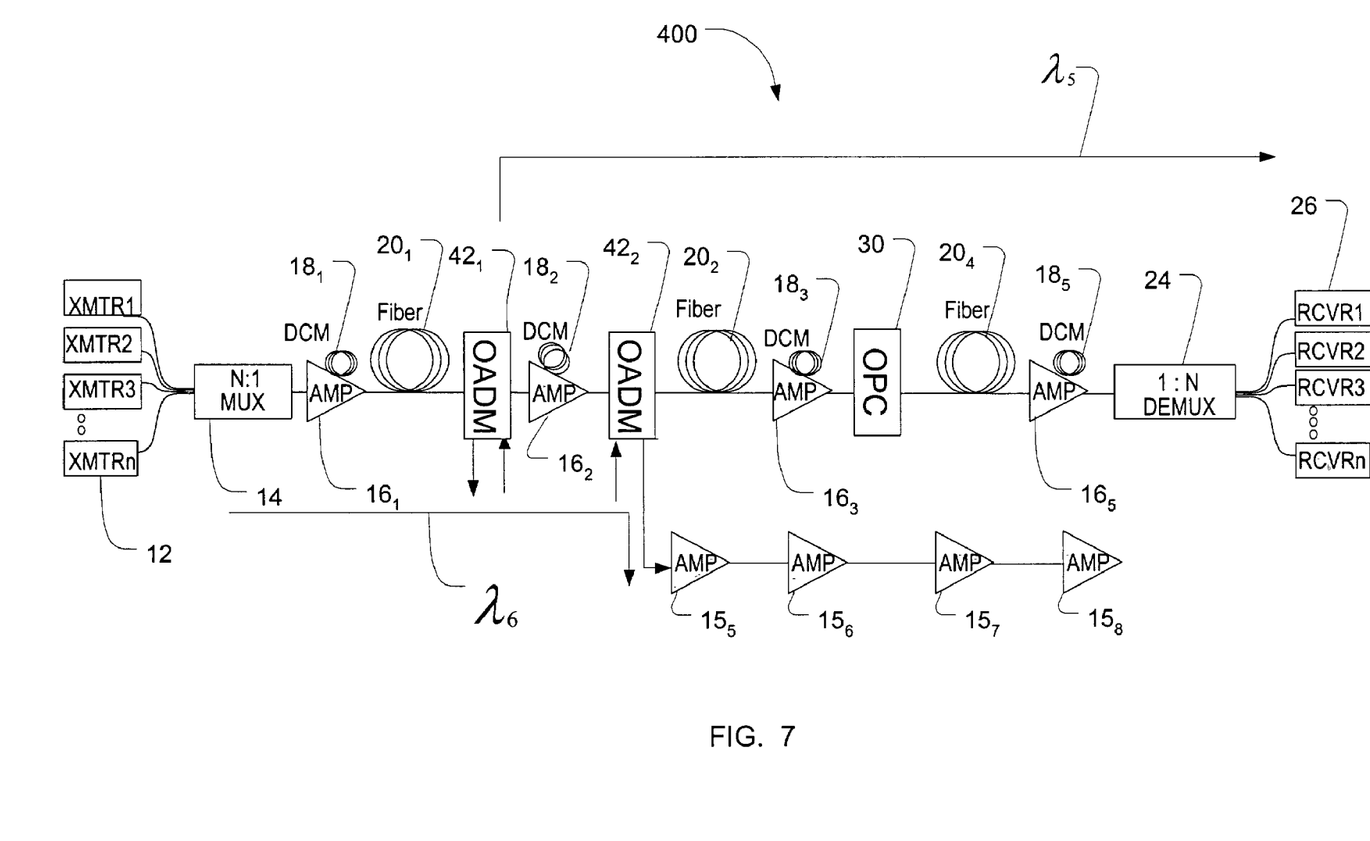
FIG. 7 is a block diagram of an exemplary optical communications network in another embodiment of the invention.

OPCs may be used in conjunction with adjusting one or more optical communication network transmission parameters to increase channel quality for one or more paths. In one embodiment, an OPC may be used in conjunction with adjusting the launch power associated with a path. FIG. 7 depicts an exemplary optical communications network 400 having two OADMs $42_1$ and $42_2$. A first channel designated as wavelength $\lambda_1$ enters the optical communications network 400 at OADM $42_1$ and continues to receivers 26. A second channel designated as wavelength $\lambda_2$ originates at transmitters 12 and is dropped from the optical communications network 400 at OADM $42_2$. The second channel is then further amplified through amplifiers $15_5$–$15_8$. Although a single wavelength channel is indicated, it is obvious that multiple WDM channels can traverse the same path.

In the example shown in FIG. 7, assume that both the first path and the second path fail to meet the system specifications and that the first path experiences more non-linear effects that the second path. Two OPCs may be used, one for the first path and one for the second path. This solution, however, is costly and may be commercially impractical. Thus, in FIG. 7 an OPC 30 is placed in the first path carrying channel $\lambda_5$ to increase path quality so that this path passes the system specifications. The second path carrying channel $\lambda_6$ may be made to pass system specifications by increasing the launch power for all channels in that path. Since the first path traverses the OPC which mitigates non-linear effects, the increase in launch power will not be deleterious to the first path.

Figure 8:
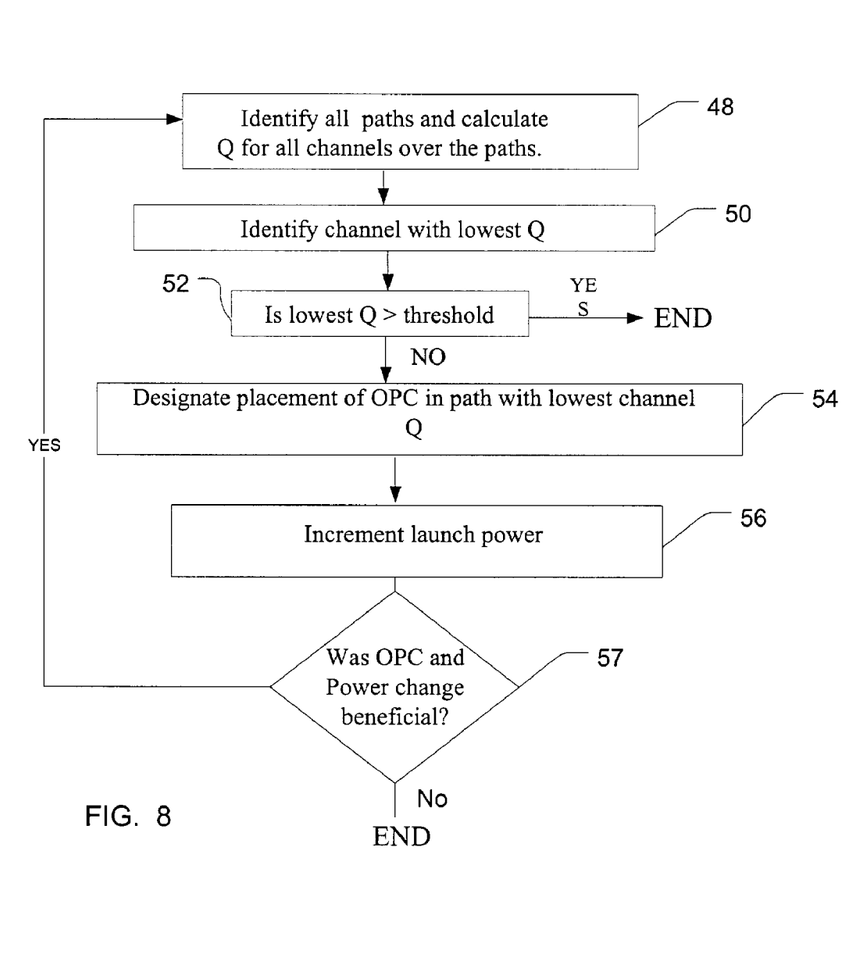
FIG. 8 is a flowchart of an exemplary process for positioning an OPC in another embodiment of the invention; and, FIG. 9 is a flowchart of an exemplary process for positioning an OPC in another embodiment of the invention.

FIG. 8 is a flowchart of an exemplary process for placing an OPC and adjusting launch power of at least one path. Steps 48–54 are similar to those described above with reference to FIG. 6 and involve designating placement of an OPC, if necessary in the optical communications network. Step 56 then increments the launch power of selected paths by increasing the launch power at amplifiers 16.

At step 57, it is determined whether the OPC and incremented launch power improved performance by raising the channel quality for the path with the lowest Q. This may be determined empirically by measuring channel quality or based on models of the network. If not, the process ends and no OPC is employed in the span. If at step 57 the OPC is determined to improve channel quality, the process may be continued until either all channels satisfy the threshold at step 52 or the OPC additions and power changes do not produce increased channel quality.

The process of FIG. 8 could be performed for multiple paths and multiple spans in the optical communications network. For example, an OPC may be placed between amplifiers $15_6$ and $15_7$ and the launch power of amplifiers $15_5$–$15_8$ increased.

Figure 9:
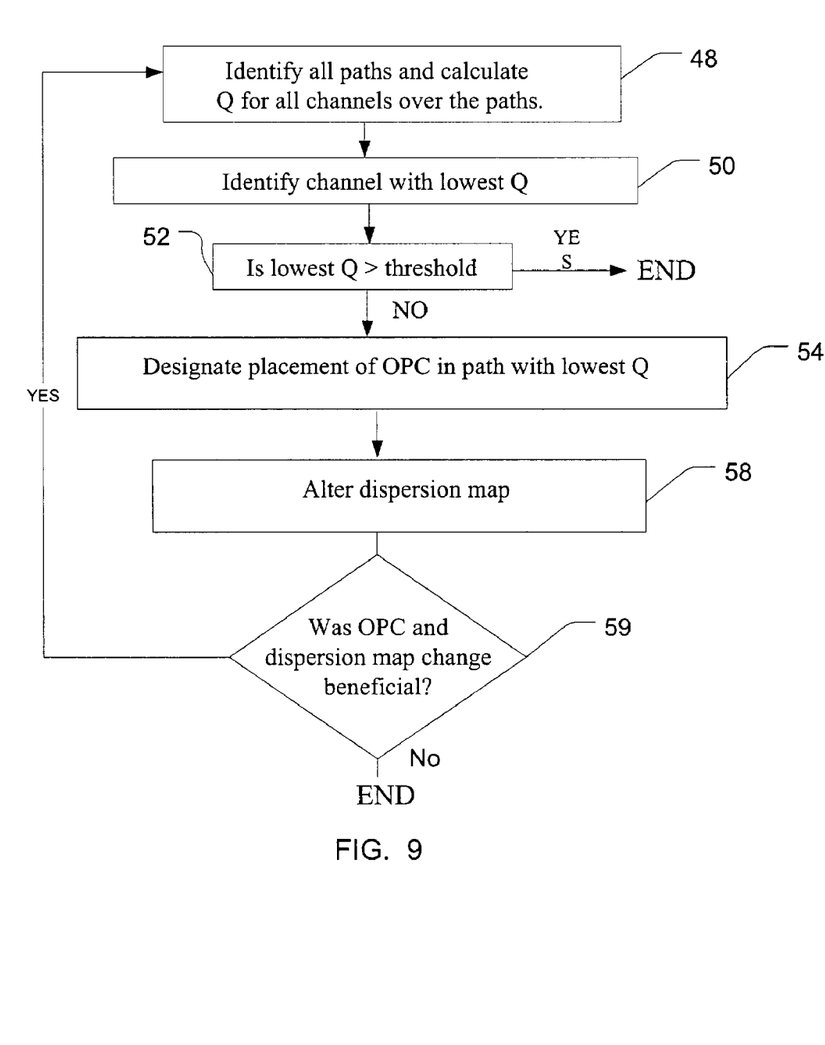

In another embodiment of the invention, one or more OPCs are used in connection with adjusting a dispersion map for the optical communications network to increase path quality. The dispersion map defines the amount and type of dispersion compensation and dispersion slope compensation provided through the optical communications network. FIG. 9 is a flowchart of an exemplary process for determining placement of an OPC and adjusting a dispersion map. Steps 48–54 are similar to those described above with references to FIG. 6 and involve designating placement of an OPC, if necessary, in the optical communications network.

At step 58, the alterations to the dispersion map are determined depending on the desired goal. Various factors in the dispersion map may be altered including the amount of dispersion compensation and dispersion slope compensation provided at each DCM 18. Also, the type of dispersion utilized may be altered. Such alterations of the dispersion map may be used to increase path quality and/or reduce costs associated with the DCMs. For example, the OPC may improve path quality such that less expensive dispersion compensation components may be utilized at one or more DCMs 18.

At step 59, it is determined whether the OPC and altered dispersion map improved performance by raising the channel quality for the path with the lowest Q. This may be determined empirically by measuring channel quality or based on models of the network. If not, the process ends and no OPC is employed in the span. If at step 59 the OPC is determined to improve channel quality, the process may be continued until either all channels satisfy the threshold at step 52 or the OPC additions and dispersion map alterations do not produce increased channel quality.

The processes described above with reference to FIGS. 6, 8 and 9 determine the position of the OPC to increase channel quality in a path having the lowest channel quality. In an alternate embodiment, the position of an OPC is determined based on maximizing the weighted average of Q values for multiple channels. In placing the OPC, it is generally more important to improve the performance of lower quality channels than the performance of higher quality channels. Thus the weighted average channel quality may be represented as:

$$Q_{weighted} = (\text{SUM}(Q_i \times W_i))/N$$

for i=1 to N, where $Q_{weighted}$ is the weighted average channel quality, Qi is the channel quality value for channel i, Wi is a weight assigned to channel i and N is the number of channels. The weight is assigned depending on whether the channel quality value is above some threshold. For example, the weight may be 2 for channels having a channel quality value exceeding the threshold and 1 for channels having a channel quality value below the threshold. In this way, the weighted average channel quality is increased as channels are raised above the threshold.

Figure 10:
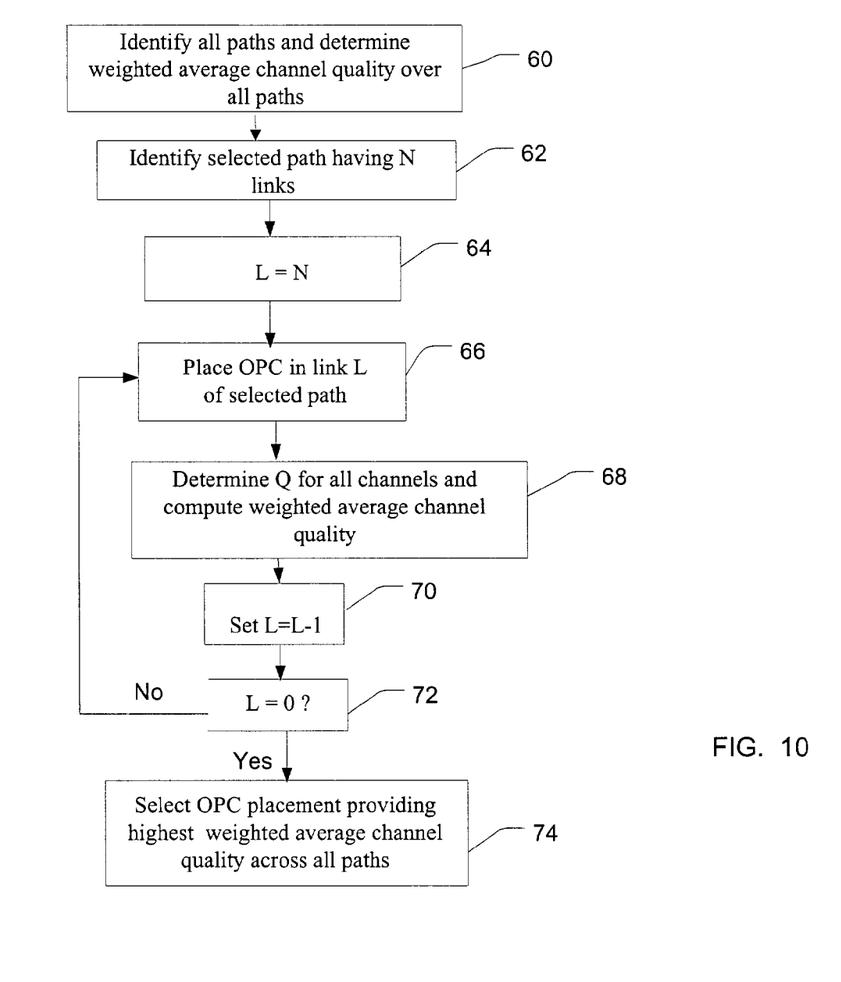
FIG. 10 is a flowchart of an exemplary process for determining the position of an OPC in another embodiment of the invention.

FIG. 10 is a flowchart of an exemplary process for determining the position of an OPC based on the effect across multiple channels and paths, and serves to increase the overall performance level and robustness of the network. The process begins at step 60 where all paths are identified and the channel quality, Q, is determined for each channel and a weighted average channel quality $Q_{weighted}$ is computed. As noted above, the channel quality may be measured or derived using models of the optical communications network. At step 62, a selected path is located and the number of links in the path is represented by the variable N. The selected path may correspond to the longest path in the span. Alternatively, the selected path may correspond to the path having the highest data rate or narrowest channel spacing.

At step 64, a counter L is set equal to N and at step 66 an OPC is placed in link L of the longest path. At step 68 the channel quality, Q, is determined for each channel and a weighted average channel quality is determined. The counter L is decreased at step 70 and the process loops until L=0 at step 72. In this manner, the weighted average channel quality for each path is obtained for various positions of the OPC. When L is zero, this indicates that a weighted average channel quality has been obtained for each OPC position in the longest path.

At step 74, the weighted average channel quality for each OPC position (including no OPC) are compared and the OPC position providing the highest weighted average channel quality is selected as the appropriate OPC position. Rather than improving the channel quality of a single path, the process of FIG. 10 determines OPC placement that most improves channel quality across multiple paths.

In systems including OADMs, the optical communications networks may utilize channel mapping techniques to define the path taken by each channel. As described above, the wavelength of a channel passing through the OPC is shifted, and thus receivers 26 need to compensate for such shifts. Channel mapping techniques provide network elements with a description of the physical path traversed by channels. Thus, receivers 26 or a receiver coupled to an OADM 42 can determine if the channel has been processed by one or more OPC's and adjust the reception wavelength accordingly.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

The invention claimed is:

1. A method of determining location of an optical phase conjugator in an optical communications network including an add/drop multiplexer, the method comprising:
    identifying paths in the optical communications network, at least one of the paths originating or terminating at the add/drop multiplexer;
    calculating a channel quality value over each of the paths;
    determining the path having a lowest channel quality; and,
    designating placement of the optical phase conjugator in the path having the lowest channel quality.

2. The method of claim 1 further comprising:
    determining a further path having a further lowest channel quality; and,
    designating placement of a further optical phase conjugator in the further path.

3. The method of claim 1 further comprising:
    adjusting a transmission parameter of the optical communications network.

4. The method of claim 3 wherein the transmission parameter is launch power of channels in the optical communications network and said adjusting includes increasing the launch power.

5. The method of claim 3 wherein the transmission parameter is dispersion compensation in the optical communications network.

6. The method of claim 3 wherein the transmission parameter is dispersion slope compensation in the optical communications network.

7. The method of claim 3 wherein the transmission parameter is a type of dispersion compensation in the optical communications network.

8. The method of claim 1 wherein the channel quality value is related to bit error rate.

9. The method of claim 1 wherein the channel quality value is related to signal-to-noise ratio.

10. A method of determining a location of an optical phase conjugator in an optical communications network including an add/drop multiplexer, the method comprising:
    identifying paths in the optical communications network, at least one of the paths originating or terminating at the add/drop multiplexer;
    identifying one of the paths as a selected path;
    determining a first position for an optical phase conjugator in the selected path;
    calculating a first weighted average channel quality with the optical phase conjugator in the first position;
    determining a further position for the optical phase conjugator in the selected path;
    calculating a further weighted average channel quality with the optical phase conjugator in the further position;
    comparing the first weighted average channel quality to the further weighted average channel quality; and,
    selecting either the first position or the further position for the optical phase conjugator in response to said comparing.

11. The method of claim 10 wherein the selected path corresponds to a longest path.

12. The method of claim 10 wherein the selected path corresponds to a path having a highest data rate.

13. The method of claim 10 wherein the selected path corresponds to a path having a narrowest channel spacing.

14. An optical communications network having a plurality of paths, a first path having a channel quality, the optical communications network comprising:
    a plurality of fiber links;
    a plurality of amplifiers in optical communication with said fiber links;
    an optical add-drop multiplexer in optical communication with said fiber links, at least one path originating or terminating at said optical add-drop multiplexer; and,
    an optical phase conjugator positioned such that the channel quality of the first path is increased to exceed a threshold.

15. The optical communications network of claim 14 wherein the plurality of paths includes a further path having a further channel quality, the system further comprising:
    a further optical phase conjugator positioned such that the further channel quality of the further path is increased to exceed the threshold.

16. The optical communications network of claim 14 wherein:
    each of said amplifiers has an associated launch power, the launch power established to improve channel quality of one of the paths.

17. The optical communications network of claim 14 further comprising:
    a plurality of dispersion compensation modules in optical communication with said fiber links.

18. The optical communications network of claim 17 wherein dispersion slope compensation of one of said dispersion compensation modules is established to improve channel quality of one of the paths.

19. The optical communications network of claim 17 wherein a type of dispersion compensation of one of said dispersion compensation modules is established to improve channel quality of one of the paths.

20. The optical communications network of claim 14 wherein the channel quality is related to bit error rate.

21. The optical communications network of claim 14 wherein the channel quality is related to signal-to-noise ratio.

22. An optical communications network having a plurality of paths, the optical communications network comprising:
 a plurality of fiber links;
 a plurality of amplifiers in optical communication with said fiber links;
 an optical add-drop multiplexer in optical communication with said fiber links, at least one path originating or terminating at said optical add-drop multiplexer; and,
 an optical phase conjugator positioned in one of the paths such that a weighted average channel quality for a plurality of channels is minimized.

23. The optical communications network of claim 22 wherein the weighted average channel quality is based on a channel quality value for each channel and a weight for each channel, the weight being dependent on whether the channel quality value is above a threshold.

* * * * *